Jan. 10, 1928.
H. E. KEMPTON ET AL
1,655,906
CHUCK
Filed July 2, 1924
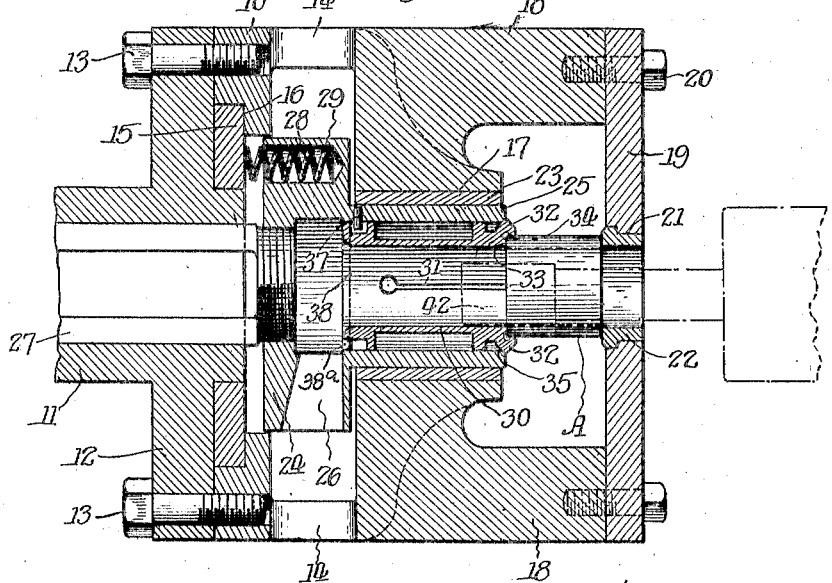
Inventors:
Herbert E. Kempton,
Keith F. Gallimore,
Raymond M. Waytych,
By Chindahl Parker Carlson
Attys.

Patented Jan. 10, 1928.

1,655,906

UNITED STATES PATENT OFFICE.

HERBERT E. KEMPTON, KEITH F. GALLIMORE, AND RAYMOND M. WOYTYCH, OF FOND DU LAC, WISCONSIN, ASSIGNORS, BY MESNE ASSIGNMENTS, TO THE HEALD MACHINE COMPANY, OF WORCESTER, MASSACHUSETTS, A CORPORATION OF MASSACHUSETTS.

CHUCK.

Application filed July 2, 1924. Serial No. 723,662.

Our invention relates to improvements in chucks, and has particular references to chucks of the collet type.

An important object of our invention is to provide a chuck in which the clamping means is pressed yieldingly into end and peripheral engagement with the work.

Another object is to provide a chuck in which the clamping means moves first to engage the end of the work, and then to engage the periphery thereof.

A further object is to provide a chuck for internal grinders, in which a single clamping means is spring pressed forwardly to center the work and to hold it securely in centered position.

Another object is to provide a chuck of the above character which is simple and sturdy in construction, and in which the work can be quickly clamped in position and removed.

Further objects and advantages will become apparent as the description proceeds.

In the accompanying drawings, Figure 1 is a longitudinal sectional view taken in plane of line 1—1 of Fig. 2 of a chuck embodying the features of our invention.

Fig. 2 is a front end view thereof.

Fig. 3 is a fragmentary sectional view of a slightly modified form.

While we have shown in the drawings, and will herein describe in detail the preferred embodiment of our invention, it is to be understood that we do not thereby intend to limit the same to the construction disclosed, but aim in the appended claims to cover all modifications and alternative constructions falling within the spirit and scope of the invention.

Referring to the exemplary embodiment of our invention illustrated in the drawings, 10 represents the body of the chuck, and 11 indicates a rotatable work spindle having a flange 12 to which the body 10 is secured by any suitable means, such as cap screws 13. The body 10 in the present instance is cylindrical and hollow, the walls being formed with a plurality of spaced clearance openings 14 through which refuse thrown off in the machine operation may be conducted away. An annular plate 15 fitting on the front end of the spindle 11 is secured in an annular notch 16 in the rear end of the body 10.

At its front end, the body 10 is provided with an axial bore 17, and with a pair of oppositely positioned and forwardly extending arms 18. A face or front plate 19 is secured to the front ends of the arms 18 by cap screws 20, and is provided with a central opening 21 in which a hardened bushing 22 is mounted concentric with respect to the axis of rotation.

Positioned in the bore 17 is a cylindrical bushing 23. An actuating member 24 is located in the body 10 and is provided with a forwardly extending sleeve 25 which is slidably mounted in the bore 17. Clearance passages 26 in the member 24 connect the interior of the sleeve 25 with the clearance openings 14. The actuating member 24 is threaded onto the forward end of a draw bar 27 extending through the spindle 11 into the body 10, and is pressed forwardly by a plurality of coiled springs 28. These springs abut at their rear ends against the annular plate 15, and at their forward ends fit into spaced holes 29 drilled in the rear face of the member 24.

Slidably mounted in the sleeve 25 is a collet member 30 which is split at 31 to provide clamping jaws 32. The jaws 32 are provided with end and peripheral bearing surfaces 33 and 34 respectively, and with wedge surfaces 35 positioned to be engaged by the inner rounded front edge 36 of the sleeve 25. A pin 37 extends inwardly from the sleeve 25 into an annular groove 38 in the periphery of collet member 30, thereby providing a lost motion connection to limit the independent relative movement of the latter. A notch 38ª is provided in the left hand wall of the groove 38 to permit ready assembly and disassembly of the sleeve 25 and the member 30.

In the modification shown in Fig. 3, an annular shield 39 having a rearwardly extending flange 40 which fits into an annular groove 41 between the body 10 and the bushing 23 is secured to the front end of the sleeve 25 to prevent the entrance of abrasive particles to the bearing surfaces between the bushing 23 and the sleeve 25. In other respects the construction is the same as that shown in Figs. 1 and 2.

While the chuck can be adapted to many different kinds of work, it is particularly adapted for use in internal grinding machines, and we have therefore illustrated a blank A having a bore which is to be ground by a suitable element 42. In loading the chuck, the draw bar 27 is released, thereby allowing the springs 28 to move the member 24 forwardly. The sleeve 25 moves the collet member 30 into end engagement with the blank A. The outward pressure of the spring jaws 32 is sufficient to prevent the pin 37 from moving against the outer side wall of the groove 38 until the collet member 30 engages the end of the blank. Upon further movement of the sleeves 25, the edge 36 moves along the wedge surface 35 to spring the jaws 32 into peripheral engagement with the blank A. The jaws 32 thus serve to center the blank A quickly and accurately in the chuck and also to clamp the blank securely in centered position.

We claim as our invention:

1. A chuck having, in combination, a hollow body provided with a plurality of radial clearance passages and an axial bore, forwardly extending arms formed on opposite sides of said body, a face plate secured to the outer ends of said arms, a bushing mounted in said plate in axial alinement with said bore, an actuating member slidably mounted in said bore, a collet jaw member slidably mounted in said actuating member, and having a lost motion connection therewith, a plurality of springs engaging said body and said actuating member to move the latter forwardly, and means for moving said actuating member rearwardly.

2. A chuck having, in combination, a body provided with a face plate, an axial bore formed in said body, an actuating member slidably mounted in said bore for movement toward and from said face plate, a collet member slidably mounted in said actuating member, said collet member being provided with wedge means positioned to be engaged by said actuating member, means for providing a lost motion connection between said members, spring means for moving said actuating member forwardly, and means for withdrawing said actuating member.

3. A chuck comprising, in combination, a hollow body, a face plate secured to the front of said body, an axial bore in said body, a collet member slidably mounted within said bore, an actuating member mounted in said body for moving said collet member toward and from said face plate, spring means for moving said actuating member forwardly, and means for moving said actuating member rearwardly.

4. A chuck having, in combination, a body provided with a face plate, an axial bore in said body, a sleeve mounted in said bore, a collet member slidably mounted in said sleeve, means operatively connecting said sleeve and said member for limited joint longitudinal movement, and spring means for moving said sleeve member forwardly to actuate said collet member.

5. A chuck having, in combination, a body shaped to receive a work blank, an axial bore in said body, an actuating member mounted in said bore, a collet member slidably mounted in said actuating member and having jaws positioned to receive the inner end of said work blank, means for moving said actuating member rearwardly, and yielding means for moving said actuating member forwardly, said actuating member acting to move said jaws first against the end of said work blank, and then into peripheral engagement therewith.

6. A chuck having, in combination, a body, a sliding member mounted centrally in said body, a collet member mounted in said sliding member, a lost motion connection between said members, spring jaws on said collet member having wedge surfaces positioned for engagement by the forward edge of said sliding member, and means for actuating said sliding member.

7. A chuck having, in combination, a body adapted to receive a work blank, a collet member centrally mounted in said body and having spring jaws to receive one end of said work blank, and a single spring pressed means for moving said collet member forwardly to bring said jaws into end engagement with the work and then flexing said jaws into peripheral engagement with said work blank.

8. A chuck having, in combination, a body provided with a face plate and having an axial bore, a movable member in said body, said member having a forwardly extending sleeve slidably mounted in said bore, clamping means mounted in said sleeve and adapted to clamp the work against said plate, means operatively connecting said member and said clamping means and permitting a limited relative sliding movement therebetween, and means for actuating said member to actuate said clamping means.

9. A chuck having, in combination, a body provided with a central bore, a movable member slidably mounted in said bore, a clamping member slidably mounted in said movable member, a lost motion connection between said members, and a plurality of springs for moving said movable member forwardly.

10. A chuck having, in combination, a hollow body, forwardly extending arms formed on opposite sides of said body, a face plate secured to the outer ends of said arms, a bushing centrally mounted in said plate, a clamping member mounted in said body, a sleeve formed on said clamping member and slidably mounted in the front of said body, a collet member slidably mounted in said sleeve and having a lost motion connection therewith, said collet member being provided with jaws having wedge surfaces, means for moving said clamping member rearwardly, and spring means for moving said clamping member forwardly.

11. A chuck having, in combination, a body, a clamping surface, an actuating member slidably mounted in said body, a clamping member slidably mounted in said actuating member, said clamping member having spring jaws adapted to engage one end and the periphery of the work to clamp the work centrally against said surface, the outer ends of said jaws projecting into wedge engagement with the adjacent end of said actuating member, a lost motion connection between said members permitting a limited independent longitudinal movement therebetween, and means for actuating said first mentioned member.

In testimony whereof we have hereunto affixed our signatures.

HERBERT E. KEMPTON.
KEITH F. GALLIMORE.
RAYMOND M. WOYTYCH.